(12) United States Patent
Dietz et al.

(10) Patent No.: US 6,353,068 B1
(45) Date of Patent: Mar. 5, 2002

(54) POLYACRYLATES AND THEIR USE AS DEGASSING AGENTS FOR PAINTS AND COATINGS

(75) Inventors: Thomas Dietz; Eberhard Esselborn; Christian Psiorz; Ute Schick, all of Essen; Stefan Silber, Krefeld; Ellen Reuter, Essen; Dirk Wolfgram, Bochum, all of (DE)

(73) Assignee: Th. Goldschmidt AG, Essen (DE)

( * ) Notice: Subject to any disclaimer, the term of this patent is extended or adjusted under 35 U.S.C. 154(b) by 0 days.

(21) Appl. No.: 09/394,441

(22) Filed: Sep. 9, 1999

(30) Foreign Application Priority Data

Sep. 9, 1998 (DE) .......................................... 198 41 559

(51) Int. Cl.[7] .............................. C08F 20/28; C08F 8/14
(52) U.S. Cl. .................... 526/319; 526/320; 526/232.1; 526/292; 526/260; 524/425; 524/437; 524/439; 524/440; 524/441; 524/443; 524/445; 524/449
(58) Field of Search ................................. 526/319, 320, 526/232.1, 292, 260; 524/425, 437, 439, 440, 441, 443, 445, 449; 523/523

(56) References Cited

U.S. PATENT DOCUMENTS

| | | | | | |
|---|---|---|---|---|---|
| 4,151,147 A | * | 4/1979 | Neuschhwanter et al. | . | 260/29.6 |
| 4,176,108 A | * | 11/1979 | Calmi | ........................ | 260/29.6 |
| 4,235,768 A | * | 11/1980 | Ritter et al. | ............... | 260/40 R |
| 4,452,776 A | * | 6/1984 | Refojo | .......................... | 424/81 |
| 5,744,523 A | * | 4/1998 | Barkowsky et al. | ......... | 523/523 |

FOREIGN PATENT DOCUMENTS

| | | |
|---|---|---|
| DE | 38 42 201 C1 | 12/1988 |
| DE | 42 36 337 C1 | 10/1992 |
| EP | 0 561 543 A1 | 3/1993 |

OTHER PUBLICATIONS

B. Vollmert, Grundriss der Makromolekularen Cehmi, Fand 1 E, Vollment Verlag 1998.
Roger J. Eldred, Rubber Chemistry and Technology vol. 58, pp. 146–153, 1984.

* cited by examiner

Primary Examiner—David W. Wu
Assistant Examiner—Tanya Zalukaeva
(74) Attorney, Agent, or Firm—Frommer Lawrence & Haug LLP

(57) ABSTRACT

Polyacrylates having an average molecular weight of from about 1000 to about 10,000 and the general formula

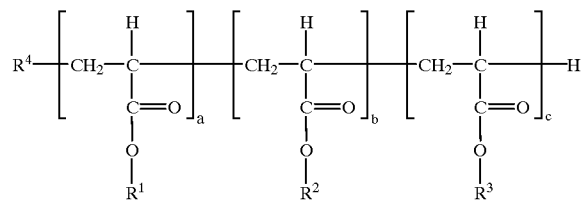

where $R^4$ is the radical of a known chain regulator or initiator, $R^1$ is identical or different and is an alkyl radical, preferably of 1 to 4 carbon atoms, $R^2$ is identical or different and is a saturated or unsaturated alkyl radical of 12 to 22 carbon atoms, $R^3$ is a hydrocarbon radical which carries at least one (meth)acryloxy group, a is from 10 to 50, b is from 3 to 20, c is from 0 to 10, and the ratio a:b+c is from 0.25 to 4 and the ratio b:c is from 1:0 to 1:0.7 as degassing agents for paints and coatings.

14 Claims, No Drawings

POLYACRYLATES AND THEIR USE AS DEGASSING AGENTS FOR PAINTS AND COATINGS

RELATED APPLICATIONS

This application claims priority to German application No. 198 41 559.1, filed Sep. 11, 1998, herein incorporated by reference.

BACKGROUND OF THE INVENTION

1. Field of the Invention

The invention relates to (meth)acryloxy-functional polyacrylates obtained by transesterification and to their use as degassing agents for paints and coatings, especially radiation-curing coatings.

2. Description of the Related Art

The prior art discloses the use of polyacrylates of a variety of compositions as degassing agents. Homopolymers of butyl acrylate and copolymers of ethyl acrylate and ethylhexyl acrylate are used in particular for this purpose. Exemplary applications are the degassing of 2-component epoxy flooring compounds (Pitture Vernici Eur. (1997), 73, 34–38) or powder coating systems (inter alia, EP-A-0 561 543). In many cases, however, the degassing action of such agents is inadequate.

The use of relatively hydrophobic polyacrylates with higher alkyl radicals and/or additional (meth)acryloxy groups as degassing agents for paints and coatings, on the other hand, has not been described.

The invention relates to the use of such special polyacrylates for degassing coatings, especially radiation-curing (UV/EB) coatings. By adding such polyacrylates it is possible to avoid the coarsely and finely disperse air bubbles incorporated into such coatings, without adversely affecting other properties of such coatings.

The increasing demands for more ecologically acceptable, emissions-reduced coating systems which can also be processed economically brought to the fore the recent technology of UV- or EB-induced radiation curing. In this technology, systems based on free-radically curable acrylates, which are discussed in more detail below, have acquired the greatest importance. Such systems are known and are described, for example, in "UV and EB Curing Formulation for Printing Inks, Coatings and Paints" (R. Holeman, P. Oldring, London 1988).

Principal binders are oligomeric acrylate compounds based on polyethers, polyesters, epoxy resins or polyurethanes. The average molar masses are customarily within the range from 200 to 4000 g/mol. The required processing viscosity is established if desired by adding low-viscosity monofunctional or multifunctional monomers, such as hexanediol diacrylate, tripropylene glycol diacrylate, trimethylolpropane triacrylate, etc., which act as reactive diluents. The curing mechanism is a radiation-induced, free-radical polymerization. In the case of UV curing, the polymerization is started by the photoreaction of an initiator. Examples of such photoinitiators are acylphosphine oxide, acetophenone and benzophenone derivatives, and thioxanthone. Amine derivatives are sometimes added as synergists for the purpose of acceleration. After coating, usually by flow, roller or spray techniques, and irradiation with UV light or electron beams, materials coated in this way can immediately be processed further or packed.

There is a causal link between the preparation of such systems, and even more so their processing properties, and the additives employed. Degassing in particular is a very critical problem, since only a few seconds elapse between application and the subsequent radiation-induced drying. Consequently, in many cases, finely (5 to 50 μm) dispersed spherical air bubbles remain in the film, resulting in a distinct loss of gloss. Radiation-curing coatings of this kind possess a very low solvency, so that the addition of known degassing substances (e.g., silicone fluids or organically modified siloxanes) can very easily result in unwanted clouding, flow defects, craters, or reduction in gloss. The addition of silicone-based additives also has a strong negative impact on the overcoatability of such coatings, so preventing the construction of multicoat systems or at least making it much more difficult. The addition of silicone-based additives is particularly undesirable in the case of flow coating applications, since it is generally not possible to prevent breaks in the curtain. Additives tried and tested by those skilled in the art nowadays include the addition of small amounts of methyl ethyl ketone or butyl acetate, although this conflicts with the desire to formulate low-emission systems—or, ideally, emission-free systems. These solvents must largely be removed from the film prior to irradiation.

Therefore, there is a need in the art for silicone-free additives which are easy to incorporate and which, when added at low concentrations, eliminate the microdisperse air or suppress its formation without adversely affecting other properties of the coating (gloss, overcoatability, intercoat adhesion, and resistance to solvents and water). At the same time, such additives should be largely independent of the nature and composition of the coatings to which they are added in order to improve said properties and hence should be capable of universal application.

OBJECT OF THE INVENTION

It is the object of the invention to find compounds which meet the above requirements and are effective when added in small amounts.

SUMMARY OF THE INVENTION

This object is achieved in accordance with the invention. Accordingly, this invention provides for polyacrylates having an average molecular weight of from 1000 to 10,000 and the general formula

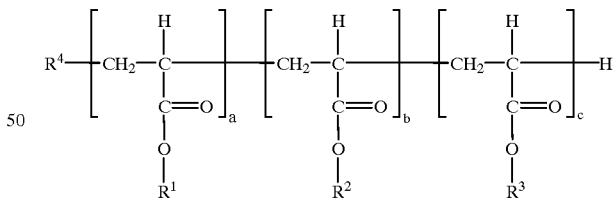

where $R^4$ is the radical of a known chain regulator or initiator, $R^1$ is identical or different and is an alkyl radical, $R^2$ is identical or different and is a saturated or unsaturated alkyl radical of 12 to 22 carbon atoms, $R^3$ is a hydrocarbon radical which carries at least one (meth)acryloxy group, a is from 10 to 50, b is from 3 to 20, c is from 0 to 10, and the ratio a:b+c is from about 0.25 to about 4 and the ratio b:c is from about 1:0 to about 1:0.7. This invention also provides for the use of those polyacrylates as degassing agents for paints and coatings.

DETAILED DESCRIPTION OF THE INVENTION

According to the prior art, compounds of this kind are obtainable by copolymerization and/or subsequent transesterification reactions. Firstly, the respective synthesis route is guided by economic considerations; secondly, however, transesterification reactions on polyacrylates having 1 to 4 carbon atoms are advantageous specifically for obtaining polymers with a narrow distribution, in the case of the desired incorporation of crosslinkable (meth)acryloxy functions, and for minimizing any residual monomer presence and associated physiological risks.

In the fairly recent past, transesterification products of this kind have been described on a number of occasions, such as, for example, in DE-A-38 42 201 or DE-A-38 42 202 and in DE-A-42 36 337. These transesterification products, for example, have significant advantages over the analogous copolymers, such as a substantially more uniform molecular weight distribution. They are largely free from monomeric fractions. Only by using the transesterification process is it possible to prepare polyacrylates whose alcoholic ester component includes unsaturated double bonds, without the formation of high-molecular-mass byproducts. For instance, it is possible without complications to transesterify polyacrylates with oleyl alcohol and at the same time with other hydroxy compounds.

Surprisingly, it has now also been found that this applies to hydroxy-functional (meth)acrylates as well. Copolymeric structures obtained in this way are novel. They are preferably obtained by polymer-analogous transesterification reactions on polyacrylates having 1 to 4 carbon atoms.

The transesterification is performed in each case on polyacrylates whose alkyl groups have preferably 1 to 4 carbon atoms. A particularly preferred alkyl group is the methyl group. The alkyl group is selected primarily in accordance with the boiling point of the corresponding alcohols.

In the case of the polyacrylates to be used in accordance with the invention, then, the transesterification component a) used comprises saturated or unsaturated alcohols of 12 to 22 carbon atoms. Particularly suitable alcohols are the saturated fatty alcohols derived from the naturally occurring fatty acids by hydrogenation, such as lauryl alcohol, myristyl alcohol, palmityl alcohol, stearyl alcohol or behenyl alcohol. Of particular interest, however, are the unsaturated alcohols, especially oleyl alcohol, which when used as transesterification component produce particularly effective degassing agents. In the case of a copolymerization, the use of oleyl acrylate as monomer is preferred.

The chain regulators and initiators provided for in the present invention are well known to those skilled in the art and such compounds may be obtained commercially or by techniques known in the art. Such compounds include, for example, alkyl mercapto compounds with n-dodecyl mercaptan being especially preferred.

The transesterification component b) can be employed additionally for the transesterification, although its use is optional and not mandatory. Its use, however, is particularly advantageous when crosslinking of the additive is desired. Suitable components b) are all hydroxy-functional (meth) acrylates, especially hydroxyethyl acrylate.

Among the formulators of radiation-curing systems, the desire for as high as possible a proportion of crosslinkable components in the formulation is becoming more and more of a priority. The use of (meth)acrylicized and thus crosslinkable polyacrylates minimizes their tendency to migrate and the proportion of substances extractable from the film. Therefore, their use is particularly preferred.

The molar ratio of the alcohols $R^2OH$ and $R^3OH$ is from about 1:0 to about 1:0.7, in particular from 1:0.1 to 1:0.5.

The transesterification is conducted with amounts of components $R^2OH$ and $R^3OH$ such that a degree of transesterification of from about 25 to about 80% is achieved. Preference is given to a degree of transesterification of from 50 to 80%.

The transesterification proceeds in the manner known per se from the abovementioned patent and application documents at temperatures from about 70 to about 140° C. in the presence of a transesterification catalyst and in the presence or absence of a solvent.

The degassing agents to be used in accordance with the invention are added to the paints and coatings in an amount of from about 0.01 to about 5% by weight, preferably from 0.1 to 1% by weight, based on the total formulation.

The polyacrylates to be used in accordance with the invention can be employed as they are or in solution in solvents, especially reactive diluents. In accordance with the prior art, further compounding with hydrophobic inorganic or organic solids is advantageous for increasing the activity. Particular preference is given to the use of hydrophobic silica. These solids can be incorporated by dispersion in amounts of from 0 to 10% by weight into the polyacrylates to be used in accordance with the invention.

The polyacrylates of the invention are employed in particular in radiation-curing coatings. Such radiation-curing coatings, based on polyether acrylates, polyester acrylates, epoxy acrylates or polyurethane acrylates, or mixtures thereof, can comprise additives (pigments, fillers, leveling agents, etc.) as are conventional in the coatings sector. The desired application viscosity of the coatings produced with the compounds of the invention can be established by appropriately regulating the addition of reactive and/or nonreactive solvents. These coating compositions are suitable for coatings which adhere to a large number of substrates, such as wood, plastic or paper, for example. These coatings can be applied in a conventional manner, by spraying, flow coating or roller coating, for example.

EXAMPLES

The examples below show first of all the noninventive preparation of the compounds to be used in accordance with the invention. They are followed by application examples which demonstrate the properties of the compounds to be used in accordance[]with the invention.

Preparation Examples
Synthesis of the Inventive and Noninventive Compounds

Example 1 A
Preparation of Polymethyl Acrylate by Free-radical Polymerization (not in Accordance with the Invention)

In a reactor, 180 g of toluene was heated to 100° C. under a nitrogen atmosphere. A solution of 4.7 g of azodiisobutyronitrile, 202.4 g of n-dodecyl mercaptan (1 mol) and 1378 g (about 16 mol) of methyl acrylate in 170 g of toluene was added dropwise at a constant rate over the course of 3 hours at 100° C. After the end of the reaction, initiation was repeated by adding 3.2 g of azodiisobutyronitrile over the course of 1 hour, after which the reaction mixture was allowed to react subsequently for a further hour. Residual monomers and solvents are removed at 150° C. under an oil pump vacuum (1 torr) and the clear, viscous product was diluted to a solids content of 80% by adding toluene. Analysis by gel chromatography assigns the resulting polymer a numerical molecular weight, Mn value (calibration against PMMA/THF), of 1848 and a weight average value, Mw, of 3101 with an Mw/Mn ratio of 1.68. The residual monomer content was <0.1%;

Examples 2 A and 3A

Preparation of Polybutyl Acrylates with Different Molecular Weights by Free-radical Polymerization (not in Accordance with the Invention)

The basic procedure of Example 1 A was repeated except that, as indicated in Table 1, the amount of n-dodecyl mercaptan, the monomer (butyl acrylate instead of methyl acrylate), and the amount of initiator were varied.

TABLE 1

| Polybutyl acrylate Ex. No. | Butyl acrylate [g]/[mol] | n-Dodecyl mercaptan [g] | Amount of initiator [g] | Molecular weight (GPC) Mn | Polydispersity factor |
|---|---|---|---|---|---|
| 2 A | 1410/11.0 | 67.0 | 7.3 | 5060 | 1.67 |
| 3 A | 1743/13.6 | 40.5 | 8.9 | 9845 | 1.78 |

Example 1

193.3 g of the polymethyl acrylate obtained from Example 1 A was heated to 100° C. and the solvent is distilled off under a vacuum of 1 torr.

The polymethyl acrylate was cooled to 60° C., 187.9 g (0.7 mol) of oleyl alcohol and 3.92 g of dibutyltin oxide as transesterification catalyst were added, and the mixture was heated at 120° C. under vacuum (15 torr). The methanol formed in the transesterification was removed by distillation.

After a reaction time of 4 hours and the collection of the corresponding amount of distillate (22 g), the first stage of the reaction was at an end.

The reaction mixture was cooled to 100° C. and 46.4 g (0.4 mol) of hydroxyethyl acrylate and 0.039 g of methylhydroquinone as inhibitor was added. The methanol which forms was removed by distillation under vacuum (60 torr) at 50° C. for 6 hours.

The vacuum is subsequently raised to 1 torr and unreacted hydroxyethyl acrylate was removed by distillation. The conversion of the second stage of the reaction was evident from the corresponding amounts of distillate.

$^1$H-NMR and GC indicated a conversion of >99% with respect to oleyl alcohol and of 50% with respect to hydroxyethyl acrylate (HEA).

Table 2 A lists further starting weights and conversions of products to be used in accordance and not in accordance with the invention. The reaction was conducted in principle in analogy to Example 1.

TABLE 2 A

| Ex. No. | Polymer | Alkanol | Hydroxy (meth)acrylate | Catalyst | Inhibitor | Conversion alkanol | Conversion (meth)acrylate |
|---|---|---|---|---|---|---|---|
| 1 | 193.3 g PMA | 187.9 g OLA | 46.4 g HEA | 3.92 g DBTO | 0.039 g MeHQ | >99% | 50% |
| 2 | 193.3 g PMA | 275.5 g OLA | 104.4 g HEA | 5.38 g DBTO | 0.054 g MeHQ | 98.80% | 49.20% |
| 3 | 193.3 g PMA | 214.4 g OLA | 69.6 g HEA | 4.42 g DBTO | 0.044 g MeHQ | 99% | 50.50% |
| 4 | 193.3 g PMA | 189.0 g STA | — | 3.93 g DBTO | — | >99% | — |
| 5 | 184.7g PBA | 125.1 g OLA | 38.7g HEA | 3.11 g DBTO | 0.031 g MeHQ | 98% | 48.90% |
| 6 | 193.3 g PMA | 275.5 g OLA | 104.4 g HEA | 5.38 g DBTO | 0.054 g MeHQ | >99% | 49.40% |
| 1 A | | | | See Example 1 A | | | |
| 8 | 193.3 g PMA | — | 69.6 g HEA | 2.27 g DBTO | 0.023 g MeHQ | — | 52% |
| 9 | 193.3 g PMA | 53.6 g OLA | 23.2 g HEA | 2.31 g DBTO | 0.023 g MeHQ | >99% | 50% |
| 10 | 139.4 g PBA | 100.5 g OLA | 23.2 g HEA | 2.35 g DBTO | 0.024 g MeHQ | 98% | 49% |

Key:
PMA = Polymethyl acrylate
PBA = Polybutyl acrylate
OLA = Oleyl alcohol
STA = Stearyl alcohol
DBTO = Dibutyltin oxide
MeHQ = Methylhydroquinone
HEA = Hydroxyethyl acrylate Inventive (Examples 1–6) and noninventive (Examples 1 A, 8–10) copolymeric polyacrylates employed correspond to the general formula 1:

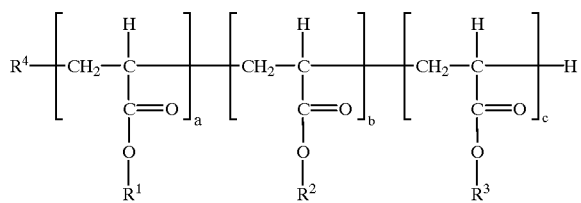

TABLE 2 B

| Ex. No. | $R^1$ | $R^2$ | $R^3$ | a | b | c | % by wt. of silica |
|---|---|---|---|---|---|---|---|
| 1 | Me | $C_{18}H_{35}$ | HEA | 7 | 7 | 2 | 0 |
| 2 | Me | $C_{18}H_{35}$ | HEA | 4 | 7.5 | 4.5 | 0 |
| 3 | Me | $C_{18}H_{35}$ | HEA | 5 | 8 | 3 | 0 |
| 4 | Me | $C_{18}H_{37}$ | — | 8 | 8 | 0 | 0 |
| 5 | Bu | $C_{18}H_{35}$ | HEA | 14 | 14 | 5 | 0 |
| 6 | Me | $C_{18}H_{35}$ | HEA | 4 | 7.5 | 4.5 | 5 |
| 1 A | Me | — | — | 16 | — | — | 0 |
| 8 | Me | — | HEA | 13 | — | 3 | 0 |
| 9 | Me | $C_{18}H_{35}$ | HEA | 13 | 2 | 1 | 0 |
| 10 | Bu | $C_{18}H_{37}$ | HEA | 30 | 30 | 8 | 0 |

Key:
Me = Methyl,
Bu = Butyl, and
HEA = Hydroxyethyl acrylate

The inventive Example 6 results from Example 2 by filling the copolymer with 5% by weight of a hydrophobic silica (Aerosil R812 from Degussa). The filler was incorporated over 30 minutes using a dissolver (1000 rpm).

In the text below, the performance properties of the various Compounds 1 to 6 to be used in accordance with the invention and of the Comparative Examples 1 A and 8 to 10 are shown.

To examine the performance properties, the following recipes of radiation-curing wood coatings are selected, these recipes being based on % by weight:

| Test systems | | |
|---|---|---|
| Clearcoat 1: | | |
| Laromer PO 84 F | 95.0 | Polyether acrylate, BASF |
| Irgacure 500 | 3.0 | Photoinitiator, Ciba-Geigy |
| Ebecryl P115 | 1.5 | Amine synergist, UCB |
| Additive | 0.5 | |
| | 100.0 | |
| Clearcoat 2: | | |
| Laromer 8863 | 87.3 | Polyether acrylate, BASF |
| Benzophenone | 3.5 | |
| Darocur 1173 | 5.2 | Photoinitiator, Ciba-Geigy |
| Ebecryl P115 | 3.5 | Amine synergist, UCB |
| Additive | 0.5 | |
| | 100.0 | |
| Clearcoat 3: | | |
| Laromer PE 55F | 40.0 | Polyester acrylate, BASF |
| OTA 480 | 20.0 | Oligomer, UCB |
| TPGDA | 35.0 | Reactive diluent, BASF |
| Irgacure 500 | 3.0 | Photoinitiator, Ciba-Geigy |

-continued

| Test systems | | |
|---|---|---|
| Ebecryl P115 | 1.5 | Amine synergist, UCB |
| Additive | 0.5 | |
| | 100.0 | |

The radiation-curing coating formulations were formulated in a conventional manner in accordance with the above recipes. The last recipe ingredient to be added in each case was the additives (0.5% by weight), which were incorporated using a dissolver.

Degassing Test 1

The coating materials described above were applied by spray application with a gravity-fed gun (nozzle 1.7 mm/spraying pressure about 3.5 bar) to darkly stained wood boards in one coat or two coats, with sanding in between (resulting coat thickness about 100 μm), and were cured using a UV unit with an Hg lamp. The amount of finely divided air included and also large air bubbles is assessed visually and evaluated using an empirical scale from 1 (bubble-free) to 4 (blank value). Micrographs are an important aid to evaluation.

Degassing Test 2

All clearcoats were stirred for 1 minute with a small disk on the dissolver, then poured for 1 minute onto an inclined glass plate, after which they were cured by radiation (120 W, 15 m/min). The amount of finely divided air included and also large air bubbles was assessed visually and evaluated using an empirical scale from 1 (bubble-free) to 4 (blank value). Here again, micrographs serve as an important aid.

Gloss Measurement

The degree of gloss (in accordance with DIN 67530) of the cured films was determined by measurement at a 60° angle using a haze-gloss gloss meter from Byk-Gardner. A high degree of stabilized spherical bubbles was always accompanied by a reduction in the gloss level.

Number of Film Defects/craters

The number of film defects was assessed visually in comparison to standard samples; in this assessment, the rating 1 was awarded to a surface free from craters and the rating 4 to a completely disrupted film with no crater-free areas in it.

Resistance Testing

Testing for film resistance took place in accordance with DIN 68861 for furniture surfaces, using water, ethanol and acetone, for example, in comparison to the coating formulation without any additive.

Overcoatability

The intercoat adhesion after overcoating was assessed by a cross-hatch test (in accordance with DIN 53151) with brisk removal of adhesive tape on two-coat wood samples.

Results for Clearcoat 1

| Ex. No. | Degassing test 1: macro/microbubbles | Degassing test 2: macro/microfoam | Degree of gloss | Film defects | Resistance | Overcoat-ability |
|---|---|---|---|---|---|---|
| blank | 4/3 | 4/4 | 77 | 2 | sat. | sat. |
| 1 | 1/1 | 1/1 | 88 | 1 | sat. | sat. |
| 2 | 1/1 | 2/1 | 86 | 1 | sat. | sat; |
| 3 | 1/2 | 1/2 | 85 | 1 | sat. | sat. |
| 4 | 1/1 | 1/2 | 86 | 1 | sat. | sat. |
| 5 | 2/2 | 2/2 | 84 | 1 | sat. | sat. |
| 6 | 1/1 | 1/1 | 87 | 1 | sat. | sat. |
| 1 A | 4/4 | 4/4 | 80 | 1 | sat. | sat. |
| 8 | 4/3 | 4/3 | 79 | 1 | sat. | sat. |
| 9 | 3/3 | 3/3 | 79 | 1 | sat. | sat. |
| 10 | 2/3 | 2/3 | 73 | 3 | sat. | sat. | sat. = satisfactory

Results for Clearcoat 2

| Ex. No. | Degassing test 2 | Micro-foam | Degree of gloss | Film defects | Resistance | Overcoat-ability |
|---|---|---|---|---|---|---|
| Blank | 4 | 4 | 75 | 2 | sat. | sat. |
| 1 | 1 | 1 | 81 | 1 | sat. | sat. |
| 2 | 1 | 1 | 81 | 1 | sat. | sat. |
| 3 | 1 | 2 | 80 | 1 | sat. | sat. |
| 4 | 1 | 2 | 81 | 1 | sat. | sat. |
| 5 | 2 | 2 | 82 | 1 | sat. | sat. |
| 6 | 1 | 1 | 81 | 1 | sat. | sat. |
| 1 A | 4 | 4 | 74 | 1 | sat. | sat. |
| 8 | 4 | 3 | 75 | 1 | sat. | sat. |
| 9 | 3 | 3 | 76 | 1 | sat. | sat. |
| 10 | 2 | 3 | 73 | 3 | sat. | sat. | sat. = satisfactory

Results for Clearcoat 3

| Ex. No. | Degassing test 2 | Micro-foam | Degree of gloss | Film defects | Resistance | Overcoat-ability |
|---|---|---|---|---|---|---|
| Blank | 4 | 4 | 70 | 2 | sat. | sat. |
| 1 | 1 | 1 | 78 | 1 | sat. | sat. |
| 2 | 1 | 1 | 79 | 1 | sat. | sat. |
| 3 | 1 | 2 | 80 | 1 | sat. | sat. |
| 4 | 1 | 2 | 77 | 1 | sat. | sat. |
| 5 | 2 | 2 | 76 | 1 | sat. | sat. |
| 6 | 1 | 1 | 77 | 1 | sat. | sat. |
| 1 A | 4 | 4 | 71 | 1 | sat. | sat. |
| 8 | 4 | 3 | 70 | 1 | sat. | sat. |
| 9 | 3 | 3 | 72 | 1 | sat. | sat. |
| 10 | 2 | 3 | 69 | 3 | sat. | sat. | sat. = satisfactory

All additive-comprising clearcoats according to the invention were additionally processed by roller application and on a flow coating machine with no problems—in particular, no curtain breaks in the case of flow coating.

As evident from the above tables, a feature of the compounds to be used in accordance with the invention is their universal applicability. As shown by the Comparative Examples, the indices a, b and c and their ratio are critical to the fact that the polyacrylates of the invention suppress the development of macrofoam and microfoam without adversely affecting other coating properties.

The above description of the invention is intended to be illustrative and not limiting. Various changes or modifications in the embodiments described herein may occur to those skilled in the art. These can be made without departing from the scope and spirit of the invention.

What is claimed is:

1. A polyacrylate having a weight average molecular weight ($M_w$) of from about 1000 to about 10,000 and the general formula

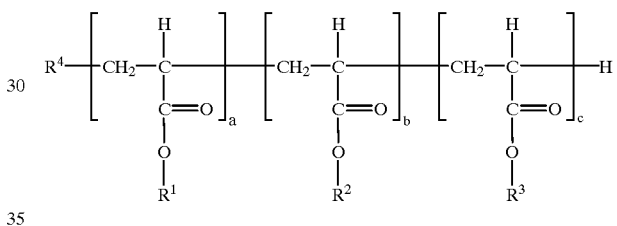

where $R^4$ is the radical of a chain regulator or initiator, $R^1$ is identical or different and is an alkyl radical, $R^2$ is identical or different and is a saturated or unsaturated alkyl radical of 12 to 22 carbon atoms, $R^3$ is a hydrocarbon radical which carries at least one (meth)acryloxy group, a is from 10 to 50, b is from 3 to 20, c is from 1 to 10, and the ratio a:b+c is from about 0.25 to about 4.

2. A polyacrylate as claimed in claim 1, with a weight average molecular weight ($M_w$) from 1,000 to 10,000 where $R^4$ is the radical of a chain regulator or initiator, $R^1$ is identical or different and is an alkyl radical of 1 to 4 carbon atoms, $R^2$ is identical or different and is a saturated or unsaturated alkyl radical of 12 to 22 carbon atoms, $R^3$ is a hydrocarbon radical which carries at least one (meth)acryloxy group, a is from o0 to 50, b is from 3 to 20, c is from 1 to 10, and the ratio a:b+c is from 0.25 to 4 and the ratio b:c is from 1:0 to 1:0.7.

3. A polyacrylate as claimed in claim 1, wherein $R^1$ is a methyl radical.

4. A polyacrylate as claimed in claim 1, wherein $R^2$ is an oleyl radical.

5. A polyacrylate as claimed in claim 1, wherein $R^3$ is an ethyl or propyl acrylate radical.

6. A method for degassing paints and coatings which comprises adding a polyacrylate having a weight average molecular weight ($M_w$) of from about 1000 to about 10,000 and the general formula

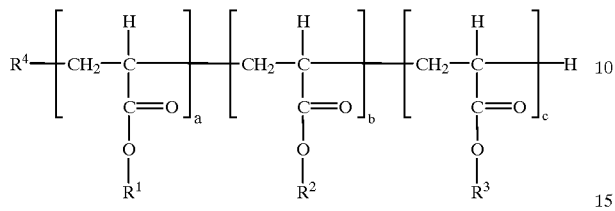

where $R^4$ is the radical of a chain regulator or initiator, $R^1$ is identical or different and is an alkyl radical, $R^2$ is identical or different and is a saturated or unsaturated alkyl radical of 12 to 22 carbon atoms, $R^3$ is a hydrocarbon radical which carries at least one (meth)acryloxy group, a is from 10 to 50, b is from 3 to 20, c is from 0 to 10, and the ratio a:b+c is from about 0.25 to about 4 and the b:c is from about 1:0 to about 1:0.7 to said paints and coats.

7. The method according to claim 6, wherein c is from 1 to 10 and the ratio b:c is from 1:0.1 to 1:0.5.

8. The method according to claim 6, wherein from about 0.01 to about 5.0% by weight (based on the total formulation) of the polyacrylate is used.

9. A radiation-curing coating composition which comprises a polyacrylate according to claim 1.

10. A coated substrate which comprises a radiation-curing coating composition according to claim 9.

11. The coated substrate according to claim 10, wherein the substrate is wood, plastic or paper.

12. A method for degassing radiation-curing (UV/EB) paints and coatings which comprises adding a polyacrylate having a weight average molecular weight ($M_w$) of from about 1000 to about 10,000 and the general formula

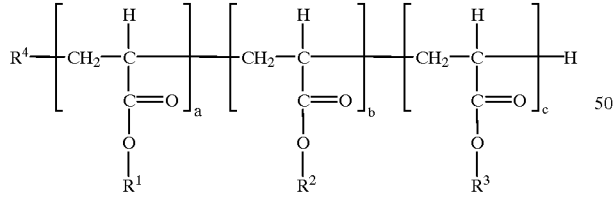

where $R^4$ is the radical of a chain regulator or initiator, $R^1$ is identical or different and is an alkyl radical, $R^2$ is identical or different and is a saturated or unsaturated alkyl radical of 12 to 22 carbon atoms, $R^3$ is a hydrocarbon radical which carries at least one (meth)acryloxy group, a is from 10 to 50, b is from 3 to 20, c is from 0 to 10, and the ratio a:b+c is from about 0.25 to about 4 and the ratio b:c is from about 1:0 to about 1:0.7 to said paints and coats.

13. A method for degassing paints and coatings that contain dispersed air bubbles which comprises adding a polyacrylate having a weight average molecular weight ($M_w$) of from about 1000 to about 10,000 and the general formula

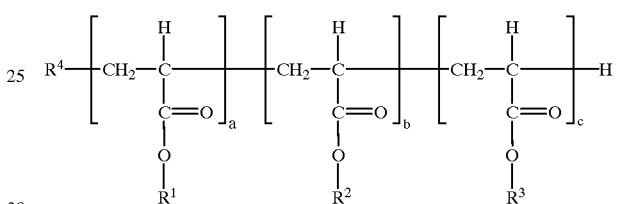

where $R^4$ is the radical of a chain regulator or initiator, $R^1$ is identical or different and is an alkyl radical, $R^2$ is identical or different and is a saturated or unsaturated alkyl radical of 12 to 22 carbon atoms, $R^3$ is a hydrocarbon radical which carries at least one (meth)acryloxy group, a is from 10 to 50, b is from 3 to 20, c is from 0 to 10, and the ratio a:b+c is from about 0.25 to about 4 and the ratio b:c is from about 1:0 to about 1:0.7 to said paints and coats.

14. The method according to claim 13, wherein the paints and coating are radiation-curing (UV/EB) paints and coatings.

* * * * *